United States Patent
Sivadasan et al.

(10) Patent No.: US 6,624,553 B2
(45) Date of Patent: Sep. 23, 2003

(54) HEAD SUSPENSION ASSEMBLY FOR MAGNETIC DISK DRIVES

(75) Inventors: Kodikkunnathukulangara Sivadasan, Temecula, CA (US); Guoxiao Guo, Singapore (SG)

(73) Assignee: Data Storage Institute (SG)

( * ) Notice: Subject to any disclaimer, the term of this patent is extended or adjusted under 35 U.S.C. 154(b) by 331 days.

(21) Appl. No.: 09/826,173

(22) Filed: Apr. 4, 2001

(65) Prior Publication Data
US 2002/0039261 A1 Apr. 4, 2002

(30) Foreign Application Priority Data

Sep. 26, 2000 (SG) ...................................... 200005436-1

(51) Int. Cl.⁷ ............................................. H01L 41/08
(52) U.S. Cl. .................. 310/369; 310/26; 360/292; 360/294.4; 360/294.6
(58) Field of Search .................. 310/367, 369, 310/26; 360/292, 294.4, 294.6, 294.5, 66, 294.3, 294.1, 294, 291.9, 290, 240

(56) References Cited

U.S. PATENT DOCUMENTS

| | | | | |
|---|---|---|---|---|
| 3,325,780 A | * | 6/1967 | Horan | 367/164 |
| 3,389,274 A | * | 6/1968 | Robertson | 310/328 |
| 3,405,289 A | * | 10/1968 | Gikow | 310/328 |
| 4,158,368 A | * | 6/1979 | Clark | 137/487.5 |
| 4,651,044 A | * | 3/1987 | Kompanek | 310/323.17 |
| 4,774,427 A | * | 9/1988 | Plambeck | 310/321 |
| 5,189,578 A | | 2/1993 | Mori et al. | 360/294.6 |
| 5,521,778 A | | 5/1996 | Boutaghou et al. | 360/264.5 |
| 6,246,552 B1 | * | 6/2001 | Soeno et al. | 360/294.4 |
| 6,538,854 B2 | * | 3/2003 | Koganezawa et al. | 360/294.4 |
| 2002/0060887 A1 | * | 5/2002 | Wu et al. | 360/294.4 |

FOREIGN PATENT DOCUMENTS

WO    WO 98/27547    6/1998

\* cited by examiner

*Primary Examiner*—Thomas M. Dougherty
(74) *Attorney, Agent, or Firm*—Townsend and Townsend and Crew LLP

(57) ABSTRACT

A microactuator (30) is provided for positioning a read/write head relative to a mounting region of a head suspension assembly of a magnetic disk drive. The microactuator (30) comprises a substantially C-shaped member (32) having a first end (34) and a second end (38) defining an air gap (42) therebetween. In one embodiment the member (32) is a piezoelectric bimorph expander; in another embodiment the member is a ferromagnetic core. Under an applied electric or magnetic field as appropriate, the size of the air gap (42) may be altered and, because the member (32) is resilient, the original air gap may be restored on removing the applied field. The microactuator may be mounted on the load beam of the head suspension assembly, or between the load beam and head slider supporting the read/write head.

24 Claims, 8 Drawing Sheets

HEAD SUSPENSION ASSEMBLY FOR MAGNETIC DISK DRIVES

BACKGROUND OF THE INVENTION

1. Field of the Invention

The present invention relates to a head suspension assembly for a magnetic disk drive, and more particularly to a microactuator for moving a read/write head relative to a mounting region of the head suspension assembly

2. Description of the Related Art

Information storage devices typically include a read/write head for reading and/or writing data onto a storage medium such as a magnetic disk within a rigid disk drive. An actuator mechanism driven by a servo control is used to position the head at specific radial locations or tracks on the magnetic disk. Both linear and rotary type actuators are well known in the art. Between the actuator and the head, a head suspension is required to support the head in proper orientation relative to the disk surface.

The head suspension carries the read/write head so that the head can "fly" over the surface of the rigid disk while the disk is spinning. The head is typically located on a head slider having an aerodynamic design so that the head slider flies on an air bearing generated by the spinning disk. The combination of the head slider and the head suspension is referred to as a head suspension assembly. The head suspension includes a load beam which has a radius or spring section, a rigid region, and a flexure. The flexure is a spring or gimballing connection typically included between the head slider and the rigid section of the load beam so that the head slider can move in the pitch and roll directions of the head to accommodate fluctuations of the disk surface. The mounting region of the load beam is typically attached to an actuator arm which supports the suspension assembly over the rotating disk. A base of the actuator arm is coupled to an actuator.

When no external forces (with the exception of gravity) are acting on the head suspension assembly to deform it in any way, it is in a "neutral un-loaded" state. When the head is flying over the spinning surface of a disk and is acted upon only by the force of the air bearing generated by the spinning disk, the head suspension assembly is in a "neutral loaded" state. However, the head suspension assembly can experience deformations that cause motion of the head away from either the neutral loaded or neutral un-loaded positions.

One way these deformations can occur involves a head suspension's tendency to bend and twist in a number of different modes, known as resonant frequencies, when driven back and forth at certain rates. Any such bending or twisting of a suspension can cause the position of the head to deviate from its neutral loaded or neutral un-loaded position. Alternatively, beneficial deformations of the suspension can be induced using a secondary-actuation or microactuation device designed to move the head relative to the remainder of the head suspension assembly.

Employment of secondary actuators working in tandem with primary Voice Coil Motors (VCMs) is an option available for obtaining high servo bandwidths in disk drives. In the case of slider-based designs, their inherently high bandwidths (by virtue of their low mass and inertia) help to overcome virtually all the lower structural modes present in the head suspension assembly. However, this would be possible only if the secondary actuator provides sufficient gain (displacement) to reject the track run-out disturbances at the required frequencies. It must also be remembered that this gain must be effected with minimal use of voltage and current because of the complexities associated with power delivery and dissipation within microstructures.

Another challenge faced by microactuator designers is provision of high degrees of in-plane shock resistance to the microactuator, as it conflicts with the aim of achieving high displacement gains in the cross-track direction. The designers eager to enhance the actuator gain compromise the lateral stiffness (in-plane stiffness in the cross-track direction) which lowers the shock-resistance of the assembly drastically. Mass is also a factor that lowers the shock resistance Also, there are issues like contamination control, reliability etc. which are major concerns with the slider-based electrostatic actuators. While improving such features, care must also be taken that they do not reflect on the overall cost of the system. In summary, it might be stated that it is desirable to have high displacement microactuators with high bandwidth and high shock resistance.

SUMMARY OF THE INVENTION

In accordance with a first aspect of the present invention, there is provided a microactuator for positioning a read/write head relative to a head suspension assembly of a disk drive, comprising a substantially C-shaped member having first and second ends, each end having an end face with the end face of one end being opposed to and spaced from the end face of the other, wherein the member is resilient and responsive to an applied magnetic or electric field, with end face to end face separation being controllable by the magnetic or electric field applied.

The substantially C-shaped member may be planar and may have a substantially annular or toroidal body with an air gap or opening communicating between the radial inner and outer peripheries and providing the first and second ends. Being resilient, the member is able to deform elastically in response to the applied magnetic or electric field, and return to its original shape once the field is removed.

The substantially C-shaped member may comprise a piezoelectric material. The member may comprise an inner region and an outer region, with the outer region surrounding the inner region, the outer region being adapted to expand relative to the inner region, or the inner region being adapted to contract relative to the outer region, in response to an applied electric field. Such relative expansion/contraction of the inner and outer regions between the first and second ends may be used to control the end face to end face separation of the first and second ends.

The member may comprise a piezoelectric bimorph. With this arrangement, the inner and outer regions are selected to expand/contract differently under the same electric field. In this way, a given applied field tends to produce different internal movements in the inner and outer regions, giving rise to a net change in the end face to end face separation. The inner and outer regions may comprise different piezoelectric materials, or possibly the same material but polarized oppositely.

The member may comprise a piezoelectric monolith, uniformly polarized with pairs of electrodes adapted to apply a first electric field to the inner region and a second electric field to the outer region. The first and second regions may be differentially energised to control the deflection of one end with respect to the other.

The microactuator may further comprise a further substantially C-shaped member or the kind hereinbefore defined, the further member being stacked above the aforementioned member to form a multi-layer structure.

In another embodiment, the substantially C-shaped member may comprise a body of a soft magnetic material (i.e. ferromagnetic material). The body may have a cable wound around the body, with an electric current carried by the cable inducing a magnetic field in the body to control end face to end face separation.

In accordance with a second aspect of the present invention, there is provided a head suspension assembly for a magnetic disk drive, comprising a load beam, a head slider and a microactuator for positioning the head slider relative to a rigid mounting end of the load beam, the microactuator comprising a substantially C-shaped member having first and second ends, each end having an end face with the end face of one end being opposed to and spaced from the end face of the other, wherein the member is resilient and responsive to an applied magnetic or electric field, with end face to end face separation being controllable by the magnetic or electric field applied. Various embodiments of the microactuator for the head suspension assembly are as defined with respect to the first aspect of the invention.

The microactuator may be mounted on the load beam. The load beam may have a slit extending from a free edge of the load beam, the microactuator being mounted such that reducing the end face to end face separation exerts a force narrowing the slit in the load beam a corresponding amount. For example, the microactuator may be mounted with a surface adjacent a first end fixed to one side of the slit and a surface adjacent the second end fixed to the other side of the slit. In this way, the air gap between the first and second ends is registered with the slit. The slit adjacent the air gap may be parallel or perpendicular to a longitudinal axis of the load beam.

The microactuator may be mounted between the load beam and the head slider. The load beam may comprise a flexible coupling and the microactuator may be sandwiched between the flexible coupling and the head slider. An upper surface of the microactuator adjacent one of the ends may be attached to the flexible coupling. A lower surface of the microactuator adjacent the other of the ends may be attached to the head slider. Such a "piggy-back" mounting arrangement may improve the shock resistance of the assembly whilst providing the required amplification at the trailing edge of the slider, particularly if the geometric center of the head slider is attached to the microactuator.

Alternatively, an end face of the other of the ends may be attached to the head slider. Such a "side-by-side" arrangement—with the microactuator adjacent the leading edge of the head slider—may help reduce stack height of the assembly.

In accordance with a third aspect of the invention, there is also provided a magnetic disk drive comprising a head suspension assembly according to the second aspect of the invention.

DETAILED DESCRIPTION OF PREFERRED EMBODIMENTS

Figure 1:
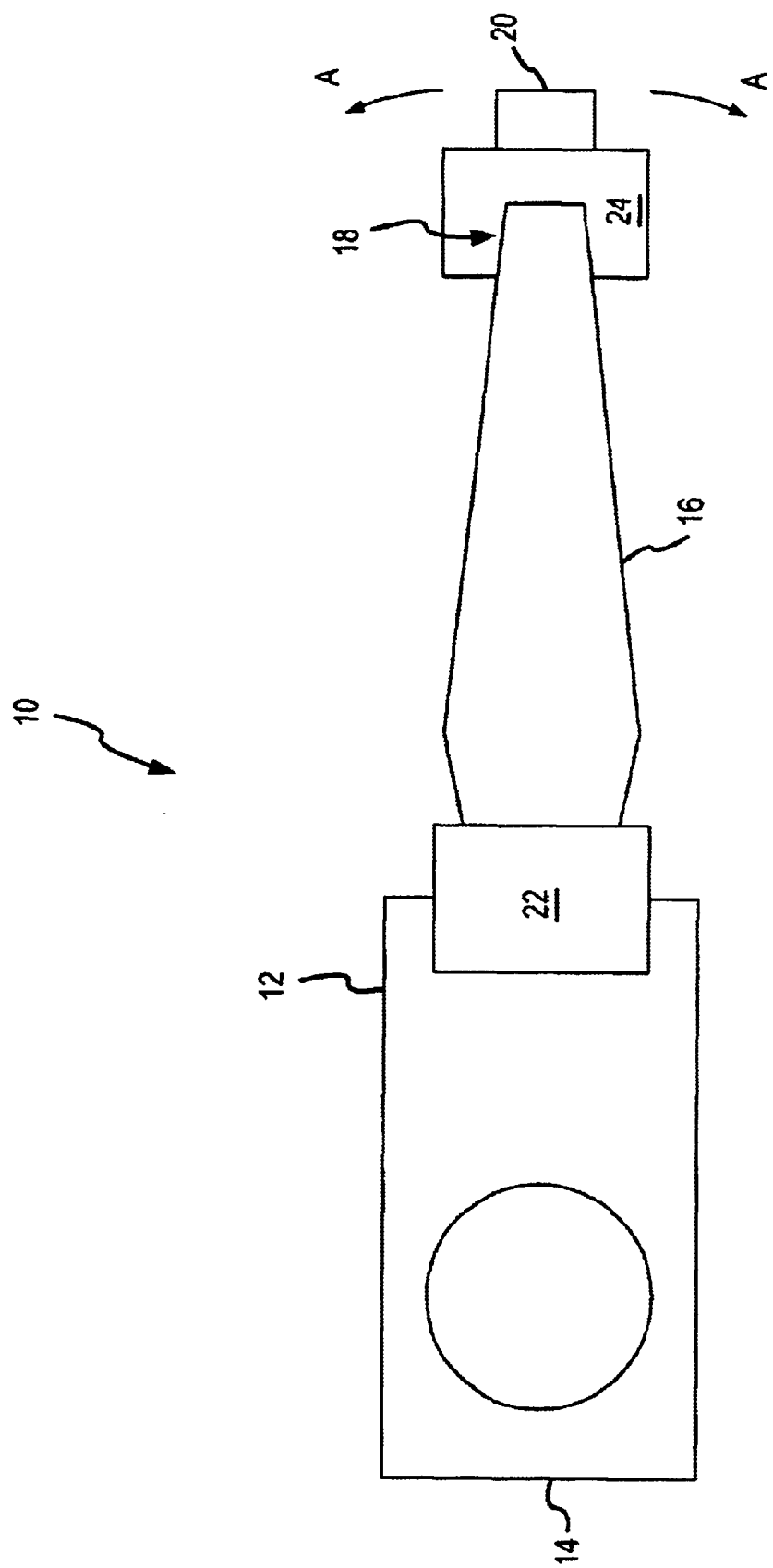
FIG. 1 illustrates schematically a head suspension assembly in accordance with the present invention.

FIG. 1 illustrates schematically a head suspension assembly 10 which includes a load beam 12 having: a rigid mounting region 14 for attachment to an actuator arm (not shown); an elongate portion 16 and a flexible coupling 18. A head slider 20 is carried by flexible coupling 18 which is typically a spring or gimballing connection. For the sake of illustration, FIG. 1 shows—highly schematically—a load beam-mounted microactuator 22 which is coupled to the rigid mounting region (14) and the elongate portion (16) and a slider-mounted microactuator 24 which is coupled to head slider 20 and flexible coupling 18.

The load beam-mounted microactuator 22 controls the position of the elongate portion 16 relative to the rigid mounting region 14. The slider-mounted microactuator 24 controls the position of the head slider 20 relative to the remainder of the assembly—the head suspension. In practice, only one of the microactuators 22 or 24 would be required to produce the fine lateral displacements of the slider head 20—see arrows A indicating "fine tracking". In response to tracking control signals, whichever of the two microactuators 22 or 24 employed would adjust the position of the read/write elements in the slider head 20 with respect to individual information tracks on the disk (not shown).

Figure 2:
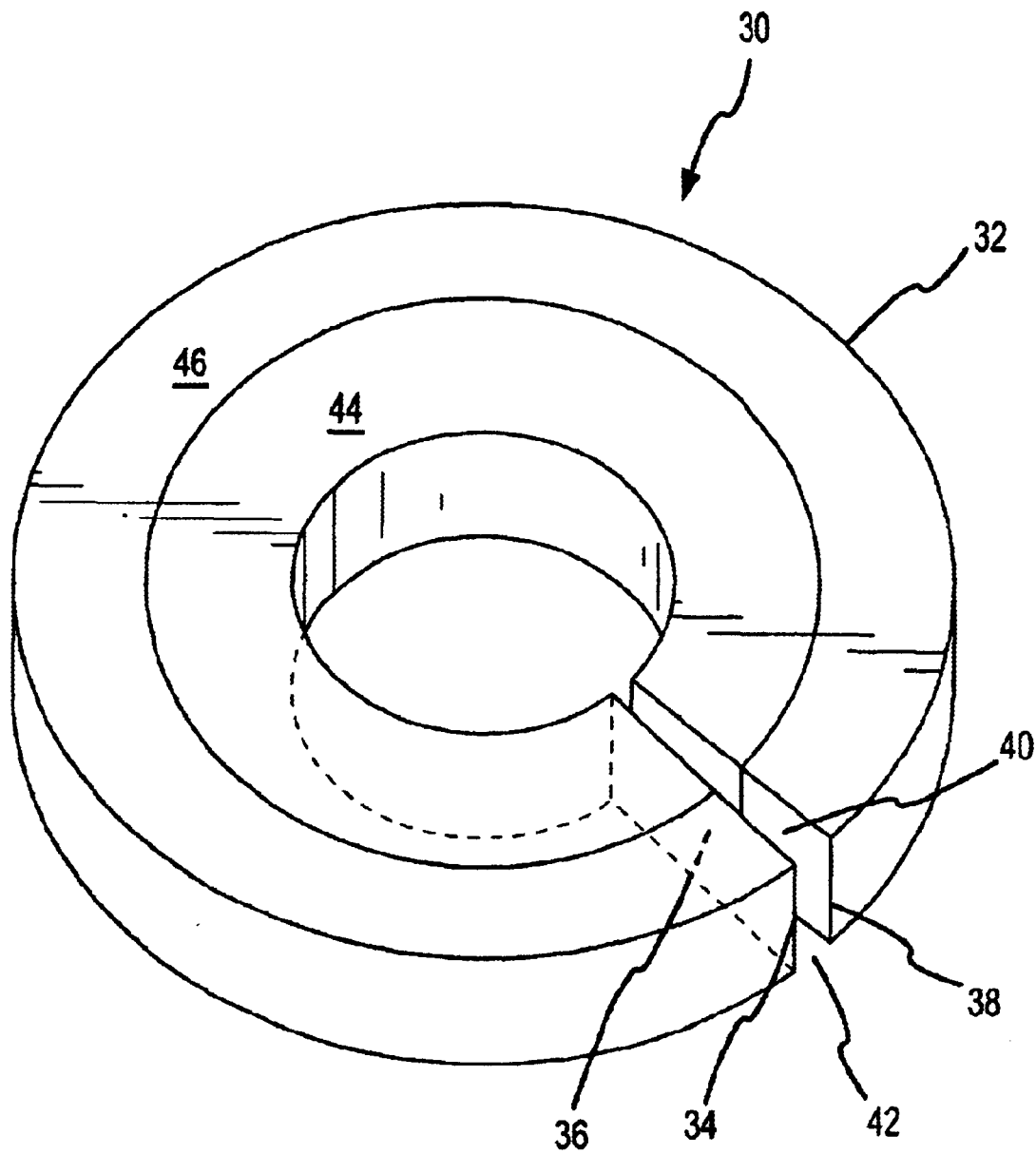
FIG. 2 illustrates schematically a first embodiment of a microactuator embodying the present invention.

FIG. 2 illustrates schematically a microactuator 30 which may be employed in either of the load beam-mounted or slider-mounted positions. Microactuator 30 is a substantially C-shaped piezo bimorph expander which comprises a body 32 having a first end 34 with a first end face 36 and a second end 38 with a second end face 40. The first and second end faces 36, 40 oppose each other and are separated by a gap 42. The body 32 consists of a near-complete inner ring 44 which is surrounded by and coupled to a near-complete outer ring 46, the rings being incomplete to provide gap 42.

The inner and outer rings 44, 46 are of piezo electric (electrostrictive) material and are axially polarized in opposite directions such that one tries to contract whilst the other tries to expand under the influence of an applied electric field. The resulting strains manifest in the form of an expansion/contraction of the body 32 thereby changing gap 42. If first end 34 is coupled to a (relatively) proximal part of the head suspension assembly (either mounting region 14 or flexible coupling 18 depending upon where the microactuator is mounted) and second end 38 is coupled to a (relatively) distal part of the head suspension assembly, controlling the size of the gap 42 will produce fine tracking movement of the head slider 20.

Figure 3:
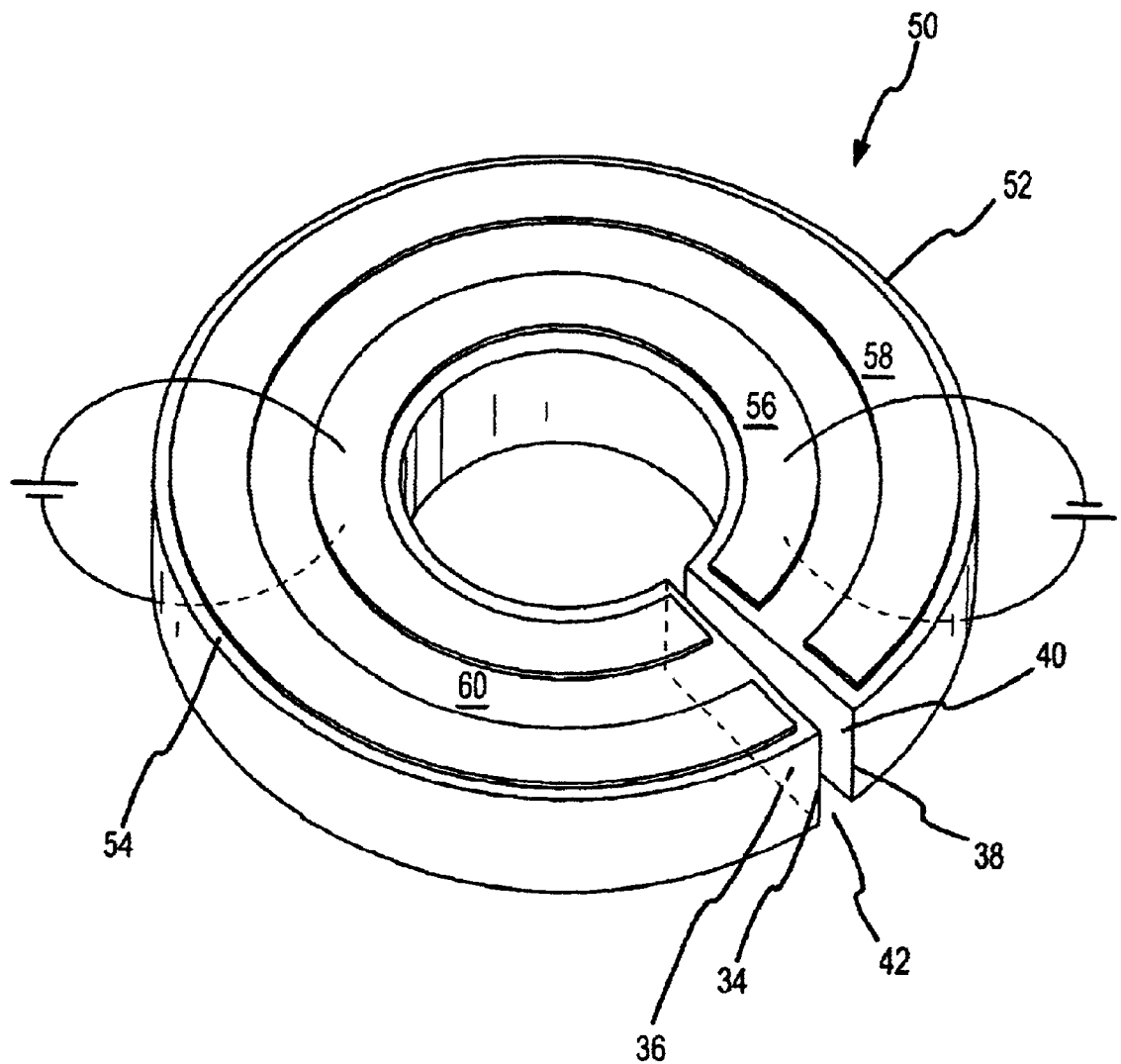
FIG. 3 illustrates schematically a second embodiment of a microactuator embodying the present invention.

FIG. 3 illustrates schematically a microactuator 50 which may be used in place of microactuator 30. The microactuator 50 is also of piezoelectric material, but the body 52 is a monolith rather than a bimorph. (The microactuators 30 and 50 have the same overall geometry, and so end parts/features in common share the same reference numerals).

The top planar surface 54 and bottom planar surface (not shown) are each provided with a pair of substantially C-shaped electrodes—an inner electrode 56 and an outer electrode 58. The inner and outer electrodes 56, 58 are electrically separated by a thin insulating annular region 60. The pairs of inner and outer electrodes 56, 58 are used to provide two different electric fields (e.g. equal, but of opposite directions; for instance, the first causing the region of the body 52 between the inner electrodes 56 to contract, and the second causing the region of the body 52 between the outer electrodes 58 to expand. Such simultaneous contraction/expansion brings the opposed end faces 36, 40 closer together, thereby narrowing the gap 42.

Figure 4:
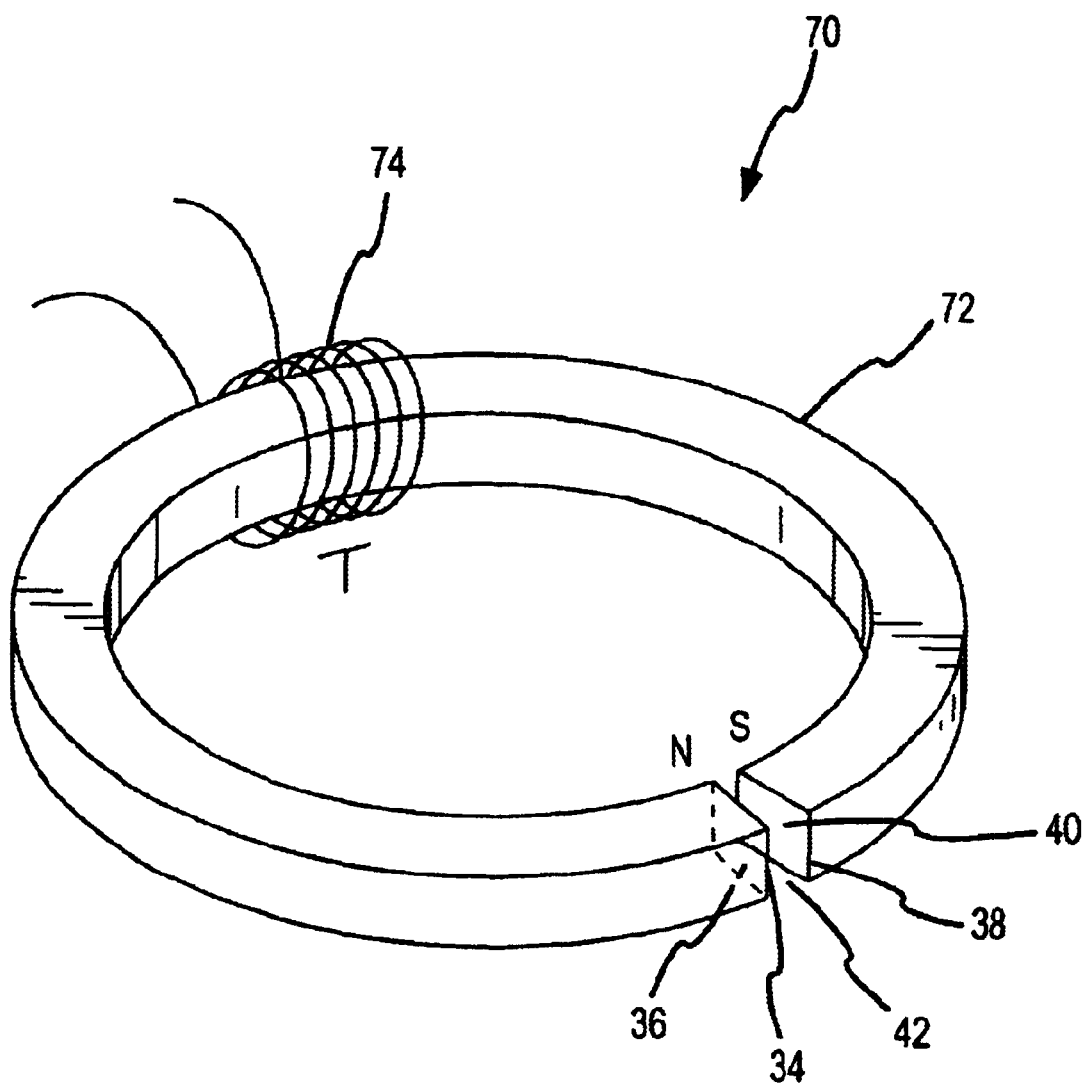
FIG. 4 illustrates schematically a third embodiment of a microactuator embodying the present invention.

FIG. 4 illustrates schematically a microactuator 70 which may be used in place of either of microactuators 30 or 50. The microactuator 70 comprises a body 72 with a ferromagnetic core wound with a few turns of copper wire 74. (The microactuator 30, 50 and 70 have the same overall geometry, and so parts/features in common share the same reference numerals). In use, an electric current applied through the copper wire generates a magnetic field which induces magnetism in the body 72. The first and second ends 34, 38 behave as opposite poles (N and S) of an electromagnet, and mutually attract, reducing the size of the gap 42.

With all three microactuators 30, 50, 70, the respective bodies 32, 52, 72 of each is resilient in the sense that applying/altering the electric/magnetic field produces a displacement bringing the first and second ends closer together/farther apart, thereby reducing/increasing the size of the gap 42. Within the operational limits of the device, the greater the field strength, the greater the displacement. Upon removal of the electric/magnetic field, the gap 42 is restored to its initial size, in other words the body 32, 52 or 72 returns to its original shape.

The microactuators 30, 50, 70 may be mounted in one of three ways in the head suspension assembly. The following three examples illustrate the mounting principles. In each case, the microactuator is labelled according to whether it is load beam-mounted (i e microactuator 22) or head slider-mounted (i.e. microactuator 24).

EXAMPLE 1

Figure 5:
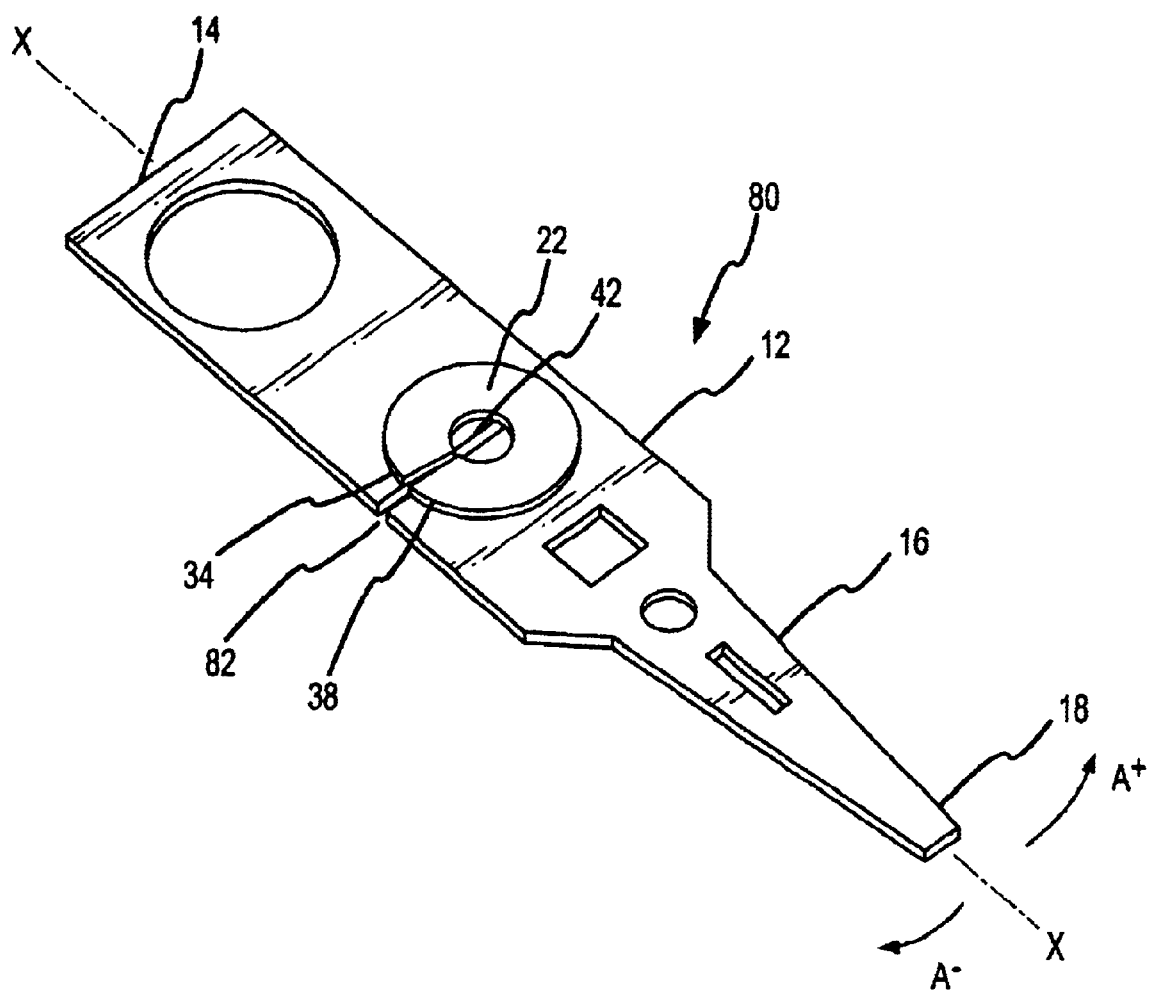
FIG. 5 illustrates a first arrangement using a microactuator according to any of FIGS. 2 to 4.

FIG. 5 illustrates a head suspension 80 with a load beam-mounted microactuator 22. The load beam 12 has a slit 82 running transverse to the longitudinal axis (XX) of the head suspension 80. The slit 82 enhances the lateral compliance of the load beam 12, making it easier to fine track in the direction of arrows A+A−. The C-shaped microactuator 22 is positioned with the gap 42 in registration with the slit 82. Two underside regions of the microactuator 22 are glued to the load beam 12. The first region, adjacent first end 34, is glued to the load beam 12 on the proximal (rigid mounting region 14) side of the slit 82. The second region, adjacent second end 38, is glued to the load beam 12 on the distal (elongate portion 16) side of the slit 82. Anchoring the microactuator 22 to the load beam 22 in this way means that the distal side of the slit 82 moves in sympathy with changes in the gap 42 (the proximal side of the slit 82 is rigidly mounted). Thus, reducing/increasing the size of the gap 42 by actuating the microactuator 22 causes flexible coupling 18 to move in the direction of A−.

In a modified form, the slit 82 may have a transverse component and a component running parallel to the axis XX. (See Figure). With such an arrangement, the C-shaped microactuator 22 may be positioned with the gap 42 in registration with the component of the slit 82 which is parallel to the axis XX. The first region, adjacent the first end 34, would be glued to the load beam on one side of the slit (the side underneath the first end); and the second region, adjacent the second end 38, would be glued to the load beam on the other side of the slit (the side underneath the second end).

EXAMPLE 2

Figure 6:
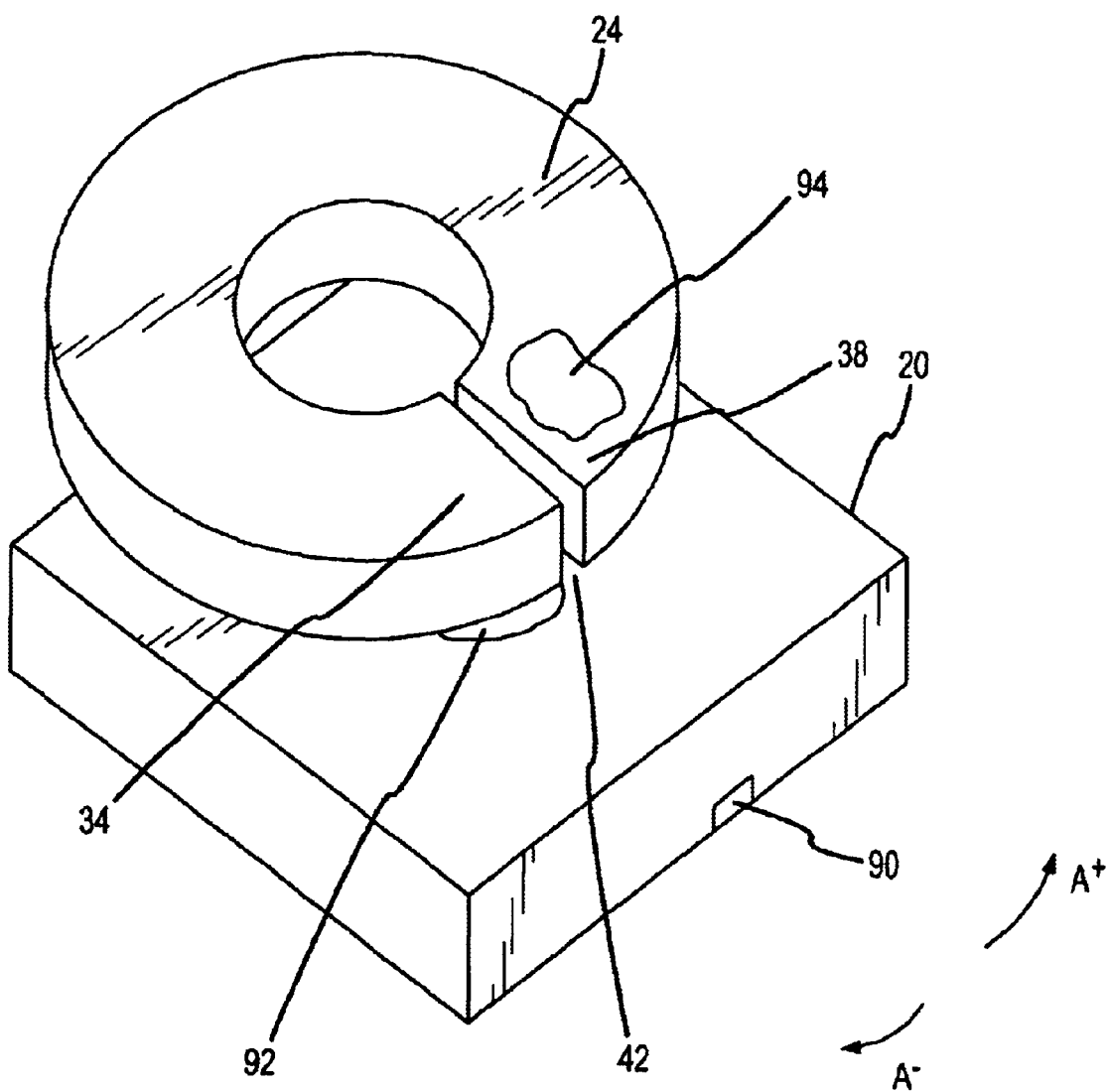
FIG. 6 illustrates a second arrangement using a microactuator according to any of FIGS. 2 to 4.

FIG. 6 illustrates a slider-mounted microactuator 24 attached to a head slider 20, complete with read/write elements 90. (The flexible coupling 18, which would be attached to the top of microactuator 24, has been omitted for the sake of clarity). The C-shaped microactuator 24 is positioned with the gap 42 aligned with read/write elements 90. An underside region of the microactuator 24, adjacent first end 34, is glued 92 to the head slider 20. An upper-surface region of the microactuator 24, adjacent second end 38, is glued 94 to a plate (not shown) which is part of the flexible coupling 18. Using the microactuator 24 in this way to couple the head slider 20 to the flexible coupling 18 means that the head slider 20 moves in sympathy with changes in the gap 42 (the flexible coupling 18 being rigidly held relative to the head slider 20). Thus, reducing the size of the gap 42 by actuating the microactuator 24 causes the head slider 20 to move in the direction of A+.

EXAMPLE 3

Figure 7:
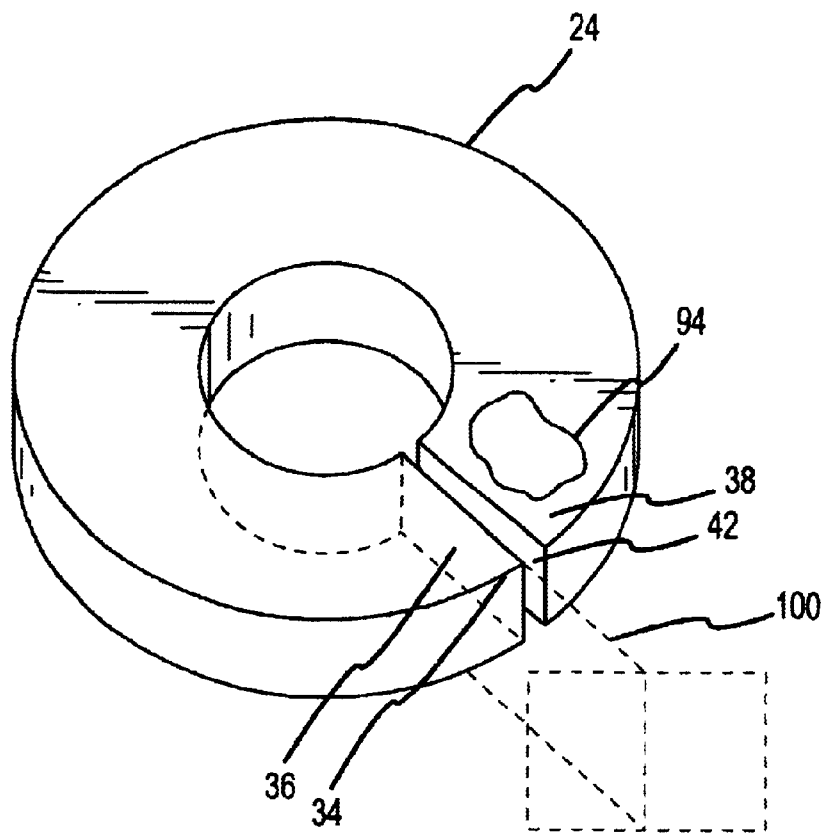
FIG. 7 illustrates a third arrangement using a microactuator according to any of FIGS. 2 to 4.

FIG. 7 illustrates a slider-mounted microactuator 24 for attachment to a head slider 20 placed alongside it. (The flexible coupling 18 and the head slider 20 have been omitted for the sake of clarity).

Figure 8:
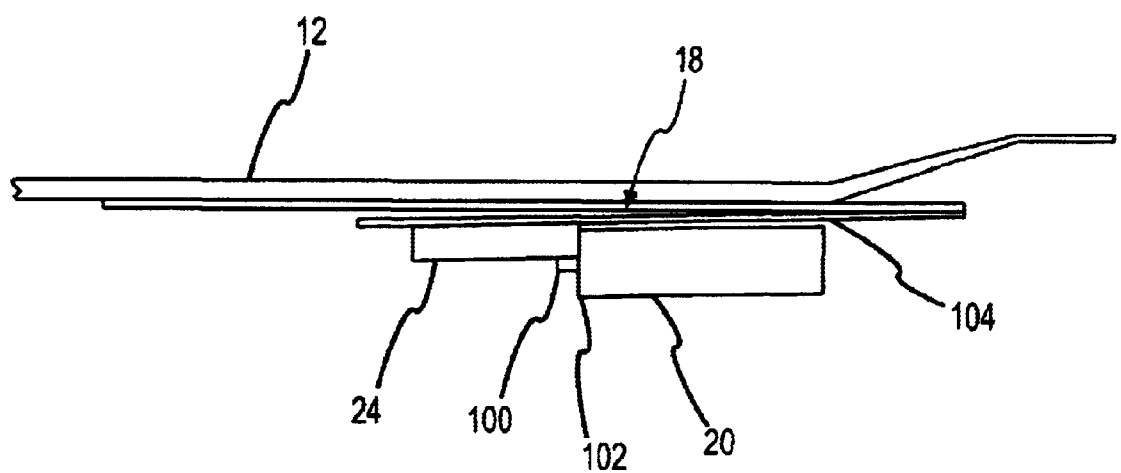
FIG. 8 is a side view of the arrangement of FIG. 7.
Figure 9:
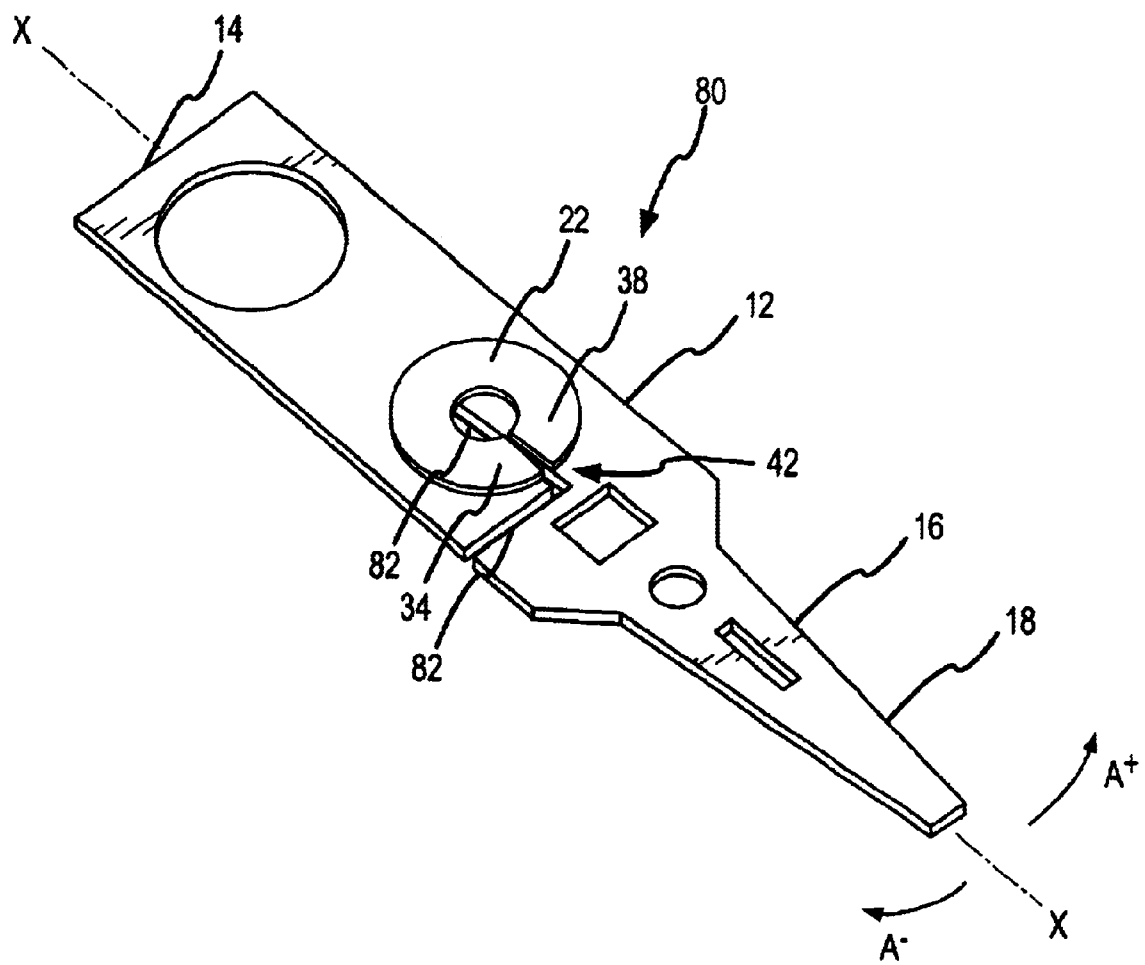
FIG. 9 is a modified version of the arrangement of FIG. 5.

FIG. 8 illustrates the mounting from the side. The C-shaped microactuator 24 is positioned with the gap 42 beside the head slider 20. The first end face 36 of the first end 24 is glued to a projecting lug 100 which extends out of the gap 42 before engaging a leading edge 102 of the head slider 20. An upper-surface region of the microactuator 24, adjacent second end 38 is glued 94 to plate 104 which is part of the flexible coupling 18 (as before). Using the microactuator 24 in this way to couple the head slider 20 to the flexible coupling 18 means that the head slider moves in sympathy with changes in the dimensions of the gap 42. Also, by mounting the microactuator 24 and head slider 20 side by side at the leading edge 102 of head slider 20 can help reduce stack height of the microactuator-slider assembly (compare with the piggy-back arrangement of Example 2).

What is claimed is:

1. A microactuator for positioning a read/write head relative to a head suspension assembly of a disk drive, comprising a substantially C-shaped member having first and second ends, each end having an end face with the end face of one end being opposed to and spaced from the end face of the other, wherein the member is resilient and responsive to an applied magnetic or electric field, with end face to end face separation being controllable by the magnetic or electric field applied.

2. A microactuator according to claim 1, in which the substantially C-shaped member comprises a piezoelectric material.

3. A microactuator according to claim 2, in which the substantially C-shaped member is a piezoelectric bimorph expander.

4. A microactuator according to claim 2, in which the substantially C-shaped member is a piezoelectric monolith having pairs of electrodes adapted to apply a first electric field to a first region of the C-shaped member and a second electric field to a second region of the C-shaped member.

5. A microactuator according to claim 1, comprising a plurality of substantially C-shaped members, each as hereinbefore defined, the plurality of substantially C-shaped members being stacked one on top of another.

6. A microactuator according to claim 1, in which the substantially C-shaped member comprises a body of ferromagnetic material.

7. A microactuator according to claim 6, further comprising a cable wound around the body such that an electric current carried by the cable induces a magnetic field in the body to control end face to end face separation.

8. A head suspension assembly for a magnetic disk drive, comprising a load beam, a head slider and a microactuator for positioning the head slider relative to a rigid mounting end of the load beam, the microactuator comprising a substantially C-shaped member having first and second ends, each end having an end face with the end face of one end being opposed to and spaced from the end face of the other, wherein the member is resilient and responsive to an applied magnetic or electric field, with end face to end face separation being controllable by the magnetic or electric field applied.

9. A head suspension assembly according to claim 8, in which the substantially C-shaped member comprises a piezoelectric material.

10. A head suspension assembly according to claim 8, in which the substantially C-shaped member is a piezoelectric bimorph expander.

11. A head suspension assembly according to claim 8, in which the substantially C-shaped member is a piezoelectric monolith having pairs of electrodes adapted to apply a first electric field to a first region of the C-shaped member and a second electric field to a second region of the C-shaped member.

12. A head suspension assembly according to claim 8, comprising a plurality of substantially C-shaped members, each according to the aforementioned substantially C-shaped member, the plurality of substantially C-shaped members being stacked one of top of another.

13. A head suspension assembly according to claim 8, in which the substantially C-shaped member comprises a body of ferromagnetic material.

14. A head suspension assembly according to claim 13, further comprising a cable wound around the body such that an electric current carried by the cable induces a magnetic field in the body to control end face to end face separation.

15. A head suspension assembly according to claim 8, in which the microactuator is mounted on the load beam.

16. A head suspension assembly according to claim 15, in which the load beam has a slit extending from a free edge of the load beam, the microactuator being mounted such that reducing the end face to end face separation exerts a force narrowing the slit in the load beam.

17. A head suspension assembly according to claim 16, in which a surface adjacent the first end is attached to the load beam on one side of the slit, and a surface adjacent the second end is attached to the load beam on the other side of the slit.

18. A head suspension assembly according to claim 8, in which the microactuator is mounted between the load beam and the head slider.

19. A head suspension assembly according to claim 18, in which the load beam comprises a flexible coupling and the microactuator is sandwiched between the flexible coupling and the head slider.

20. A head suspension assembly according to claim 19, in which an upper surface of the microactuator adjacent one of the ends is attached to the flexible coupling, and a lower surface of the microactuator adjacent the other of the ends is attached to the head slider.

21. A head suspension assembly according to claim 20, in which the lower surface is attached to the geometric center of the head slider.

22. A head suspension assembly according to claim 18, in which the end face of one of the ends is attached to the head slider.

23. A head suspension assembly according to claim 22, further comprising a lug extending from the said end face for engagement with the head slider.

24. A magnetic disk drive comprising a head suspension assembly according to claim 8.

* * * * *